(12) United States Patent
Fink et al.

(10) Patent No.: US 11,323,657 B2
(45) Date of Patent: May 3, 2022

(54) INITIATION OF TWO-WAY AR SESSIONS USING PHYSICAL MARKERS

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, INC., Portland, OR (US)

( * ) Notice: Subject to any disclaimer, the term of this patent is extended or adjusted under 35 U.S.C. 154(b) by 0 days.

(21) Appl. No.: 17/001,084

(22) Filed: Aug. 24, 2020

(65) Prior Publication Data

US 2020/0396418 A1    Dec. 17, 2020

Related U.S. Application Data

(63) Continuation-in-part of application No. 16/195,595, filed on Nov. 19, 2018, now Pat. No. 10,785,269.

(60) Provisional application No. 62/588,612, filed on Nov. 20, 2017.

(51) Int. Cl.

| | |
|---|---|
| *H04N 7/14* | (2006.01) |
| *G06K 9/46* | (2006.01) |
| *H04L 67/52* | (2022.01) |
| *G01S 19/01* | (2010.01) |
| *G06K 19/06* | (2006.01) |
| *G06K 19/07* | (2006.01) |

(52) U.S. Cl.
CPC ............ *H04N 7/147* (2013.01); *G01S 19/01* (2013.01); *G06K 9/46* (2013.01); *G06K 19/06028* (2013.01); *G06K 19/06037* (2013.01); *G06K 19/0723* (2013.01); *H04L 67/18* (2013.01)

(58) Field of Classification Search
CPC .......... H04N 7/147; G01S 19/01; G06K 9/46; G06K 19/06028; G06K 19/06037; G06K 19/0723; H04L 67/18
See application file for complete search history.

(56) References Cited

U.S. PATENT DOCUMENTS

| | | | |
|---|---|---|---|
| 10,395,290 B1* | 8/2019 | Koo | G06Q 30/0613 |
| 2015/0141005 A1* | 5/2015 | Suryavanshi | H04W 48/16 455/434 |
| 2015/0245168 A1* | 8/2015 | Martin | G06Q 50/01 715/751 |
| 2018/0322702 A1* | 11/2018 | Djajadiningrat | A61N 1/3993 |

* cited by examiner

*Primary Examiner* — Chong Wu
(74) *Attorney, Agent, or Firm* — Schwabe Williamson & Wyatt

(57) ABSTRACT

Methods and systems for the remote delivery of professional services, using augmented reality (AR), are disclosed. In embodiments, a user scans or acquires a physical marker, such as an optical code or radio beacon. The physical marker provides information to the user's device to allow it to connect to a server. The physical marker may also provide contextual data, possibly in conjunction with contextual data from the user's device. The server then provides a list of professionals on the basis of the contextual data. The user selects a professional, and the server initiates a video session between a user device and a professional device, where the professional can superimpose one or more AR objects on the video, to be displayed on the user device.

16 Claims, 7 Drawing Sheets

US 11,323,657 B2

INITIATION OF TWO-WAY AR SESSIONS USING PHYSICAL MARKERS

RELATED APPLICATIONS

The present disclosure claims priority as a continuation-in-part to U.S. patent application Ser. No. 16/195,595, filed 19 Nov. 2018, which in turn claims priority to U.S. Provisional Application Ser. 62/588,612, filed 20 Nov. 2017, the contents of each of which are hereby incorporated by reference as if fully set forth herein.

TECHNICAL FIELD

The present disclosure relates to the field of augmented reality (AR), and specifically to systems and methods for initiation of two-way AR-supporting communications sessions.

BACKGROUND

Consumers often have need of professional assistance in a variety of settings, such as engaging in projects on a do-it-yourself (DIY) basis, attempting to learn new skills, diagnosing problems, or obtaining assistance during sales to determine the best product or products to buy for a given situation, to name a few examples. In such situations, obtaining professional help often required either travel by the professional to the consumer's location or travel by the consumer to the professional's location. In the case of sales, assistance often depended on staffing and/or availability of a sales consultant at the retail location. In any of the foregoing cases, interactions with the professional are in-person.

Video conferencing capabilities have become commonly available due to the widespread adoption of high-speed data communications along with mobile devices and other computing devices capable of supporting video chat. Consumers thus increasingly have the ability to chat face to face with professionals without the necessity of an in-person presence. Video conferencing, however, can present a different challenge insofar as a professional is hampered in demonstrating physical aspects, such as indicating what part of an apparatus or implement should be manipulated, and in what sort of fashion. However, recent mobile devices may support the insertion of augmented reality objects into a captured video stream. In some instances, these AR objects may be inserted by a professional engaged in a video conference with a consumer, and reflected onto the consumer's device. These AR objects can facilitate a professional demonstrating physical manipulations to a consumer.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
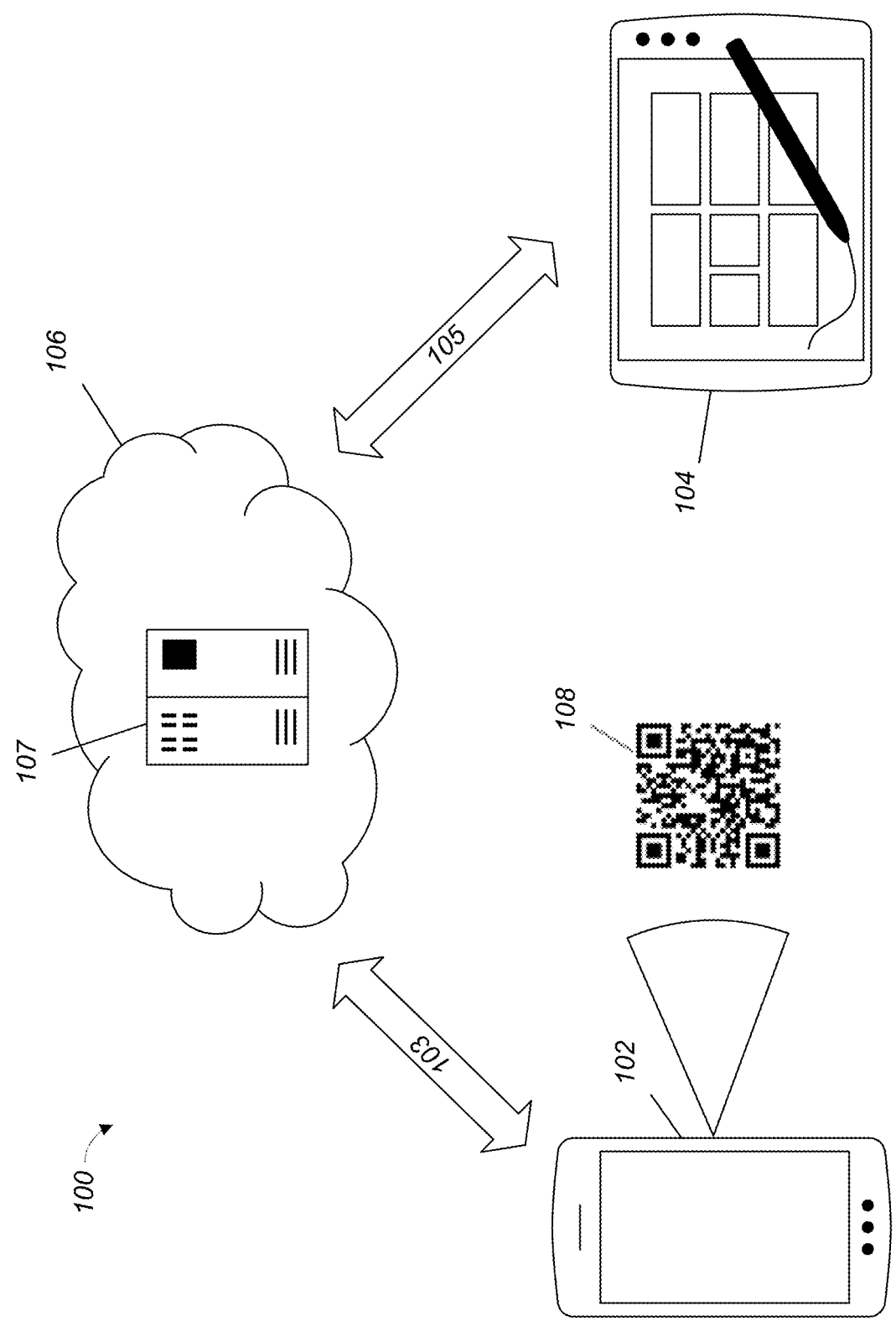
FIG. 1 illustrates a block diagram of the system components of one possible embodiment of an augmented reality system for delivery of professional services, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Remote communication services such as Microsoft's Skype®, Apple's Facetime, Google's Duo, and similar Internet-based services that support two-way video communications have enabled distance delivery of a variety of services, such as educational courses, instruction, lessons, and other professional services that primarily require face to face interaction. Incorporating support for augmented reality (AR) into a two-way video communications session, such as the insertion and manipulation of AR objects within a video stream by one device in the session that are reflected on the other device in the session, helps further facilitate delivery of services beyond what would be capable with just a video session.

Determining the right professional to contact can involve a number of different factors. Context for selection of a suitable professional or list of professionals may be obtained from the context of a user's surroundings. For example, a user may point a camera equipped to a smartphone at an appliance such as a dishwasher or refrigerator. The dishwasher or refrigerator may be detected via object recognition or another suitable method, and a list of professionals qualified to repair such appliance may be provided. As appliances become increasingly advanced and offer functionality beyond the basic appliance functionality (e.g. a "smart" appliance, such as a refrigerator, which can track contents and automatically create shopping lists or reorder staple ingredients), it may be desirable to engage the services of a professional who is certified or otherwise trained to service the unique features of a given brand, or even make and model, of appliance.

In other examples, additional context for selection of an appropriate professional or list of professionals may be desirable. For example, the location of the user contacting a professional may be relevant to professional selection. If a user is located within a retail establishment, such as an appliance showroom, connection to a repairman would not be appropriate. Rather, the user would appropriately be connected with an advisor who could answer questions about a given appliance, such as a manufacturer's representative who could explain unique features of a given appliance model. In such circumstances, simple object recognition would be insufficient. In another example, it may be desirable to connect directly to a representative or technician qualified to diagnose and service a given appliance, such as a smart appliance described above. In such an example, an appliance may be provided with one or more tags that can convey any necessary information and/or context to enable connection to an appropriate representative. In still other examples, a given geographic region may be designated to be serviced by a particular professional or group of professionals, for a variety of different reasons, e.g. local parts availability, ensuring that a customer is within a service area in the event an in-person visit is necessary, ensuring that geographic territories assigned to a given sales team are respected, etc.

Embodiments disclosed herein provide systems and methods for establishing an two-way communications session with an appropriate representative, professional, or other remote party based upon one or more physical markers. The physical markers may convey information about the nature of the professional to contact, the nature of the appliance or object that is to be the subject of the communications session, and/or particular aspects of the appliance or object that may allow selection of a professional with expertise beyond what a general technician may possess. Still further, the physical marker or markers may include specific instructions for establishing the two-way communications session, such as an address or target for a remote server to coordinate or establish the communications session. Other possible embodiments and examples will be described herein.

As used herein, "two-way communications session" contemplates any sort of two-way communications, and not just AR-enabled sessions. While the following disclosure discusses primarily AR-enabled two-way communications sessions, it should be understood that the disclosed systems and methods can be used to establish any two-way communications session that does not support AR placement. Still further, in some embodiments the two-way communications session may be video only (no audio or AR), or even audio only (no video or AR).

FIG. 1 illustrates an example system 100 that embodies an augmented reality (AR) platform for the delivery of professional services. System 100 may include a consumer device 102 and a service provider device 104, which in turn may be linked via a network 106. In embodiments, system 100 may evaluate an image or picture of a monument or physical marker 108 (in the depicted embodiment, a QR code) which may be captured by consumer device 102, which is then used to select an appropriate professional or professionals to contact. The monument or physical marker 108 may further provide information for establishing a two-way communications session, such as a remote server address, contextual information for professional selection, executable code to provide any necessary and/or unique support for the communications session, or any other relevant information. As used herein, "professional" is any person who may respond to a two-way communications session with a user of consumer device 102. In some instances, the professional may possess a skill set relevant to solve a problem faced by the user, or may be able to provide relevant advice or guidance to the user. However, this is not intended to be limiting; it should be understood that "professional" may be any person who bears some relevance to the user and/or the context in which the user utilizes system 100. The physical marker 108 and the process of evaluation will be discussed in greater detail below.

As will be discussed below, the physical marker 108 may provide information relevant to establishing a two-way communications session with a professional relevant to the physical marker 108. In some instances, system 100 may identify a single professional for communication. In other instances, system 100 may identify multiple possible professionals. Where multiple professionals are available or suggested, the user and/or system 100 can provide one or more professionals of the multiple professionals with additional information, such as including any images or video captured by the consumer device 102. The images and/or video may include not just the physical marker 108, but of the context around the physical marker 108, such as additional pictures of any objects to which the physical marker 108 is affixed or in close proximity. Each professional can then individually evaluate the supplied information and determine whether they are comfortable delivering assistance remotely via system 100, and, via system 100 or another channel of communication, provide any other relevant considerations to assist the user in selecting a suitable professional.

System 100 may be at least partially configured to evaluate any captured pictures or video, including physical marker 108. Further, such evaluation may be carried out using object recognition and/or artificial intelligence. This analysis may be performed automatically, or upon manual triggering by the user. Upon detection, system 100 (which may include any app of consumer device 102) may then suggest possible professionals or a single professional from which the user may select. In some embodiments, system 100 may automatically connect the user to an appropriate professional. In embodiments, a user may simply open up an app on consumer device 102 associated with system 100, and the app may automatically access a camera on consumer device 102 and further automatically capture a picture or video feed, for an essentially "zero-touch" approach. Such embodiments may further automatically evaluate the picture to determine the class of professionals or specific professional to recommend to a user, or may automatically connect the user to an appropriate professional. Still other embodiments may have a user perform a gesture or other input to trigger capture of a picture or video.

Figure 6:
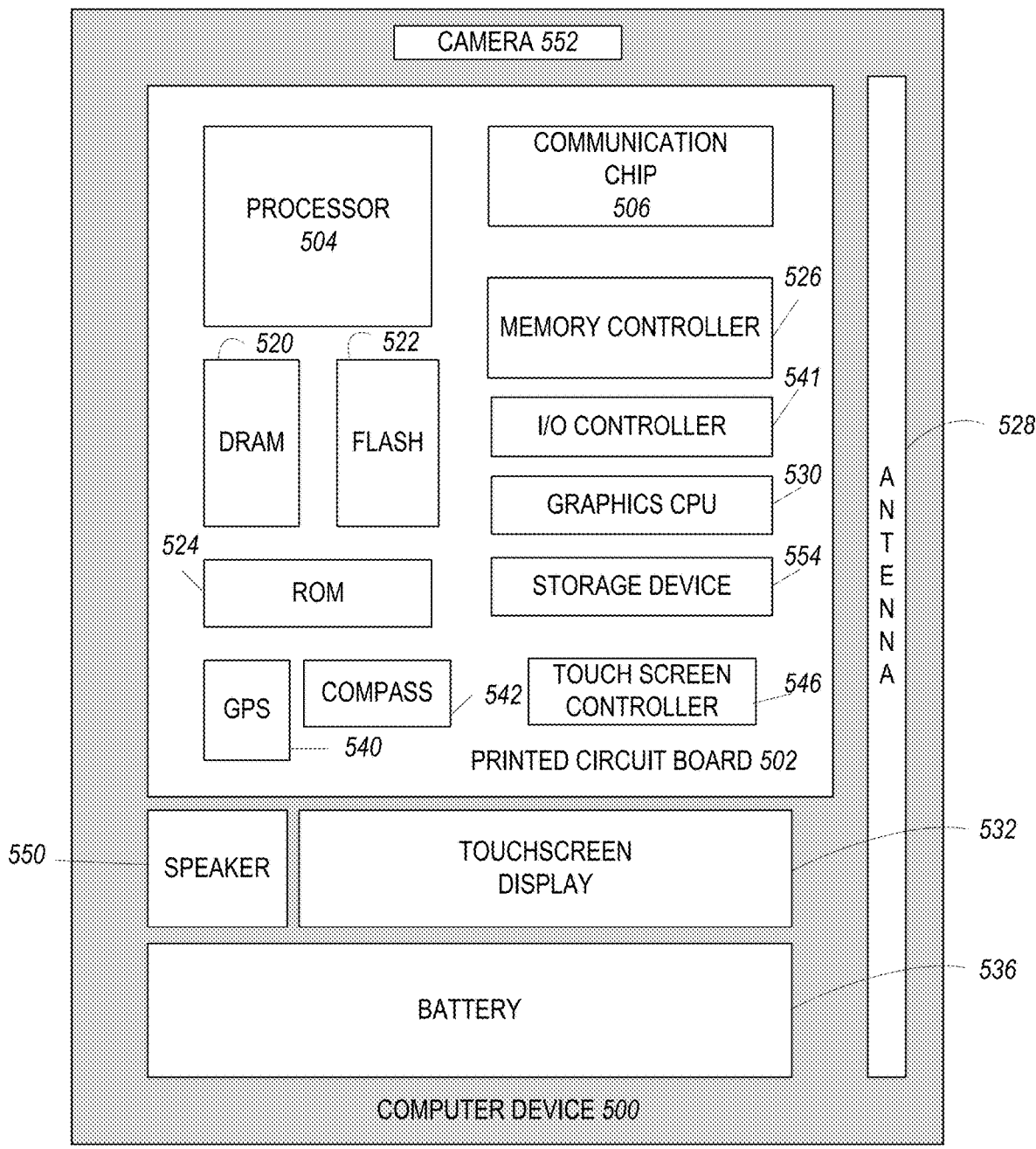
FIG. 6 is a block diagram of an example computer that can be used to implement some or all of the components of the system of FIG. 1, according to various embodiments.

Consumer device 102 and service provider device 104 may be a computer system such as the computer device 500 depicted in FIG. 6, and in some embodiments may be a mobile device such as a smartphone, tablet, or other similar device that has an integrated processor, screen, video camera, and network communications interface. In some embodiments, the mobile device may include a wearable device, such as a smartwatch, a heads-up display, a head-mounted display or head-mounted computing device, such as smart glasses, or another type of handheld computing device. In other embodiments, consumer device 102 may be a computer system with discrete components, e.g. the system box or CPU is distinct from I/O peripherals. Consumer device 102 and service provider device 104 may be, but do not need to be, identical. For example, a service provider may prefer to use a dedicated computer terminal (e.g. a desktop or laptop computer) to interact with a consumer device 102. Likewise, a consumer may prefer to use a tablet or laptop as alternatives to a smartphone for consumer device 102.

Consumer device 102, in embodiments, includes or is electrically coupled to a camera for taking still photos and/or capturing video, and may be capable of both detecting and capturing a photo of physical marker 108, transmitting the pictures and/or video over a network 106 as part of a two-way communications session, as well as receiving data over network 106 that is supplied by a user of service provider device 104. Consumer device 102, further, may include or be electrically coupled to one or more radio transceivers for detecting and communicating with various radio beacons, such as a WiFi hotspot, a Bluetooth device, an NFC device, an RFID tag, or similar radio technology that can transmit data. As will be discussed below, physical marker 108 may be implemented using radio technology capable of being read by a radio transceiver on consumer device 102, in addition to in alternatively to a visual marker.

Service provider device 104, in some embodiments, similarly is capable of receiving photos and/or video over network 106 from consumer device 102, transmitting pictures and/or video of network 106 as part of a two-way communications session with consumer device 102, and allowing a user of service provider device 104 to place one or more AR objects or otherwise interact with the received photos and/or video. Service provider device 104 can transmit information about the placed AR object(s) over network 106 back to consumer device 102, whereupon consumer device 102 updates a display attached to consumer device 102 to depict the captured photos and/or video with the placed AR object(s).

Consumer device 102 may run a dedicated app, as discussed above, to provide functionality for system 100. Other embodiments may allow some or all functionality to be handled via a web site or web application (e.g. a software as a service, "SaaS", approach). As will be discussed below, some embodiments may provide some or all functionality by an applet or an app clip. Still other embodiments may use dedicated hardware, or a combination of software and hardware, to provide functionality for system 100 to the user. Likewise, service provider device 104 may run a dedicated app to provide functionality for system 100, or use a web site, web application, dedicated hardware, or a combination of the foregoing. Some embodiments may use the same app or other method of delivering necessary functionality on both consumer device 102 and service provider device 104, possibly with functionality appropriate to the user (either the consumer or professional) enabled based upon a user-supplied credential or other indication of the user's role. For example, such an app, applet, or app clip may provide for capture and transmission of video when configured in a consumer role, and enable placement of one or more AR objects (when the two-way communications session is configured to support AR objects) when configured for a service provider role. The app may, in some embodiments, also allow the user of consumer device 102 to place AR objects or manipulate placed AR objects (regardless of who initially placed them) and have them reflect onto the service provider device 104. Other embodiments may provide separate apps (or other methods) for a consumer side and professional side, which may offer similar or differing functionality. At least a part of the necessary functionality may, in various embodiments, be provided by the hardware, operating software, or both, of consumer device 102 and/or service provider device 104.

As mentioned above, this functionality alternatively or additionally may be provided via a website or web interface. In some embodiments, a separate website or web interface may be provided for each of the consumer device 102 and the service provider device 104, while in other embodiments, a single website or web interface may provide appropriate functionality to both the consumer device 102 and the service provider device 104. In some embodiments, a central server 107, discussed below, may provide some or essentially all functionality for system 100, with any application or website on consumer device 102 and/or service provider device 104 acting essentially as a front end for displaying and interacting with content provided by central server 107. Physical marker 108 may be used by consumer device 102 to establish an initial connection to central server 107, at which point central server 107 may assume any further processing and/or functionality, including further processing of any information obtained from physical marker 108. The website or web interface may offer less, comparable, or more functionality than an app.

In addition to the functionality described above of image capture, analysis, selection, and connection with a professional, system 100 includes, in embodiments and as mentioned above, selection or recommendation of a professional or professionals at least partially based upon contextual information obtained from physical marker 108, as well as the ability for either a user, via consumer device 102, or a professional, via service provider device 104, to superimpose one or more AR objects to assist in the remote delivery of services. Central server 107 may coordinate and synchronize, or assist in the coordination and synchronization, of such AR objects between consumer device 102 and service provider device 104. The functionality of synchronizing AR objects may be supplied by central server 107, consumer device 102, service provider device 104, a combination of two or more of the foregoing, and/or via another provider or source external to system 100, depending upon the specifics of a given implementation. Although previous embodiments described placement of AR objects by the service provider, in other embodiments consumer device 102 may also allow placement and interaction with AR objects, which may further be transmitted and reflected on service provider device 104.

Network 106 may be a network capable of supporting the exchange of a video feed between consumer device 102 and service provider device 104 as well as augmented reality instructions. In some embodiments, network 106 may comprise the Internet, a local area network, wide area network, metropolitan area network, or a combination of the foregoing, or another suitable type or types of network communication. As can be seen, consumer device 102 may connect to network 106 via a communications link 103, and service provider device 104 may connect to network 106 via a communications link 105. Consumer device 102 may use information obtained from physical marker 108 to at least partially determine how to connect over network 106, such as to central server 107. Consumer device 102 and service provider device 104 may be configured to communicate over a network link using an appropriate protocol, such as TCP/IP. Each of communications links 103 and 105 may be any one or more of the foregoing network types. The various devices that comprise network 106 are well known to practitioners skilled in the relevant art, and will not be discussed further herein.

In some embodiments, network 106 comprises a server, collections or clusters of servers, one or more data centers, or other suitable means for data processing. For example, network 106 may be implemented as a cloud service, with consumer device 102 and service provider device 104 each connecting to the cloud service. The cloud service may be operated by a provider of services for system 100. In the depicted example, network 106 includes a central server 107, which may be controlled by the provider of some or all of system 100. Central server 107 may comprise one or more computer devices 500, such as is known for data centers and cloud services. Further, depending on the specific needs of a given implementation, central server 107 may be implemented in a distributed fashion, with multiple node potentially located in geographically diverse areas.

Central server 107 may be configured to handle some or all of the functionality of system 100 described above. For example, central server 107 may handle processing a capture of physical marker 108 and associated information provided by physical marker 108, a picture, series of pictures, or video stream from consumer device 102, and/or interactive directions from service provider device 104. Processing may include analysis of any context associated with physical marker 108, such as proximate objects (e.g. objects within a predetermined distance from physical marker 108 and/or consumer device 102), and physical location of a consumer device 102 relative to fixed geographic locations (e.g. a geofence or similar logical barrier defined by a physical area or location). Processing may also include extraction of information and/or performing any analysis of any captured images, video, or other information (including physical marker 108 and any associated context) via object recognition or artificial intelligence (AI) to select a suitable professional or class of professionals. Central server 107 may coordinate the synchronization of one or more AR objects placed by service provider device 104 to consumer device 102 (and/or vice-versa), for presentation on a screen associated with consumer device 102 and/or service provider device 104.

Central server 107 may further maintain and/or disseminate, to consumer device 102, a list or directory of professionals associated with system 100, from which system 100 selects a professional or class of professionals to recommend or connect to a user of consumer device 102. In some embodiments, central server 107 may only supply a list of one or more professionals in response to a query from consumer device 102, which itself may handle any image analysis, including object recognition or AI processing, to determine a desired professional or class of professionals. In other embodiments, central server 107 may only supply a list of one or more professionals at partially related to a physical marker 108 detected by the consumer device 102, and used to connect to central server 107. In some embodiments, physical marker 108 may provide the necessary information for consumer device 102 to query central server 107. Consumer device 102 may handle at least some processing of physical marker 108 in various embodiments, while central server 107 may handle at least some processing of physical marker 108 in other embodiments. In still other embodiments, central server 107 may receive the results of any image analysis and/or analysis of physical marker 108, and select one or more professionals in response, and supply the results to consumer device 102. In yet other embodiments, central server 107 may receive images or video, including an image or other information from physical marker 108, from consumer device 102 as described above, and handle processing and selection of one or more suitable professionals.

Some combination of any of the foregoing embodiments may also be possible, with a different approach taken depending upon the nature and capabilities of a given consumer device 102. For example, where consumer device 102 is a smartphone running a dedicated app, consumer device 102 may be able to perform extraction of all information from physical marker 108, some or all object recognition on a captured photo or video, and simply request a list of possible professionals from central server 107. In contrast, where consumer device 102 is a web browser, consumer device 102 may simply pass any photos or video to central server 107 for processing and recommendations.

Consumer device 102 and service provider device 104, in some embodiments, are capable of directly establishing a two-way communications link, thereby allowing a user of consumer device 102 to directly connect to a selected professional without need of leaving system 100. In some embodiments, system 100, such as via central server 107, coordinates communications, acting as a relay or communications provider. In such embodiments, central server 107 may also coordinate exchange of AR objects between consumer device 102 and service provider device 104, where the two-way communications session is AR-capable. In such embodiments, a physical marker 108 may provide information to consumer device 102 for connecting to central server 107. In some instances, the information may include instructions for connecting to a particular central server 107, such as when there are multiple possible central servers 107 that are available for connection. In other embodiments, consumer device 102 and service provider device 104 directly link over network 106 without going through a central server 107. In such an embodiment, physical marker 108 may provide information to consumer device 102 for connecting directly to a specific service provider device 104 out of a possible plurality of service provider devices. In such an embodiment, any AR objects inserted into the video stream are communicated directly from one device to the other. In some such embodiments, either consumer device 102, service provider device 104, or aspects of both, may provide the functionality and serve in the capacity of central server 107.

It should be understood that, although the terms "consumer", "user", "professional", and "service provider" are used in throughout this disclosure, these terms are only employed by way of example, and are not otherwise intended to be limiting. The disclosed embodiments may be used between any combination of parties, e.g. only consumers, only service professionals, a consumer and service professional. The terms are broadly interchangeable to refer to any person that uses an embodiment of system 100. A "service provider" or "professional" could use a consumer device 102, and likewise a "consumer" or "user" could use a service provider device 104. Similarly, the labeling of consumer device 102 and service provider device 104 are also only for the sake of example to denote a likely relationship between the users of each device. There may be no practical difference (if any difference at all) between the functionality and capabilities of consumer device 102 and service provider device 104.

Figure 2A:
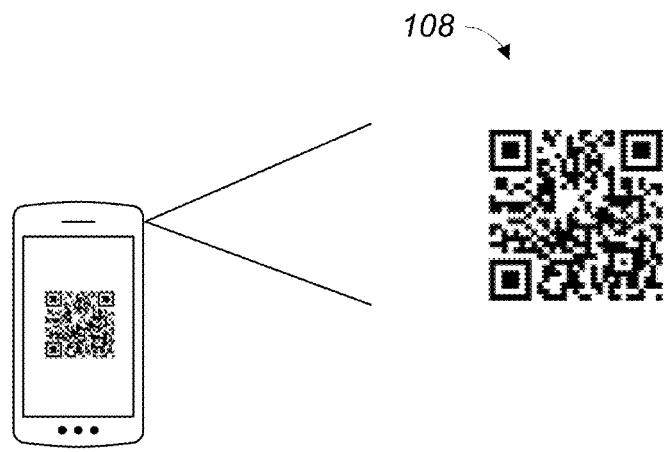
FIGS. 2A-2C are example possible physical markers that can be used to establish a two-way session that supports augmented reality objects, according to various embodiments.

Physical marker 108 is a machine readable physical object or monument, and may be attached to or embedded within an object, or be portable, such as a business card that a user of consumer device 102 may take. In the example of FIG. 2A, as with the example in FIG. 1, physical marker 108 is depicted as a QR code, an optical target which can be recognized and decoded by a system such as consumer device 102 and/or central server 107. The QR code is capable of optically storing various amounts of data, up to several kilobytes, depending up on the size of the code. Other embodiments of physical marker 108 may use different methods for data storage and retrieval, as will be discussed below with respect to FIGS. 2B and 2C. Consumer device 102 may be configured to extract the data from the QR code. The stored data includes instructions for connecting to a remote system, such as central server 107 and/or a service provider device 104. The instructions for connecting to a remote system may comprise a URL or other address or indicator for accessing a central server 107 or service provider device 104, as well as any necessary login information or access key(s). The stored data may also include instructions for connecting to a remote database storing contextual information, which may be separate from the remote system, and/or a unique key or identifier associated with contextual information to facilitate information retrieval.

The stored data may further include contextual information that can be used by the remote system to inform or guide selection of one or more professionals to present to a user of consumer device 102, or alternatively to directly connect with via consumer device 102, such as where there is only a single professional or contact. Contextual information can include any information that may be relevant to selection of a professional, including location of the physical marker 108, an object or objects to which physical marker 108 is attached, e.g. appliance, tool, display, etc., a store, business, corporation, or other entity associated with the physical marker 108, the nature of physical marker 108, any printed information on or associated with physical marker 108, any brand names or company names associated with physical marker 108, and/or any other information that may impact upon a selection of a professional or professionals to communicate with the user of consumer device 102.

In some embodiments, at least part of the contextual information may be part of the stored data of the physical marker 108. In other embodiments, at least part of the contextual information may be obtained from a database separate from physical marker 108 based upon a unique ID or key that is part of the stored data. The database may be located on a remote server, such as central server 107. In one possible embodiment, consumer device 102 may use information from physical marker 108 to connect to the central server 107. The information may include a unique key which is passed by consumer device 102 to central server 107, from which central server 107 can retrieve contextual information automatically. In another possible embodiment, consumer device 102 may connect to central server 107 with information from physical marker 108 and provide central server 107 with contextual information that consumer device 102 retrieved directly from physical marker 108. In yet another possible embodiment, consumer device 102 may connect to central server 107 with information from physical marker 108, and also connect to a separate remote server (possibly using information from physical marker 108) to obtain contextual information, which is then provided to central server 107. In still other embodiments, contextual information may be obtained both from stored data from physical marker 108 as well as a separate database, and/or from a database associated with central server 107.

Figure 2B:
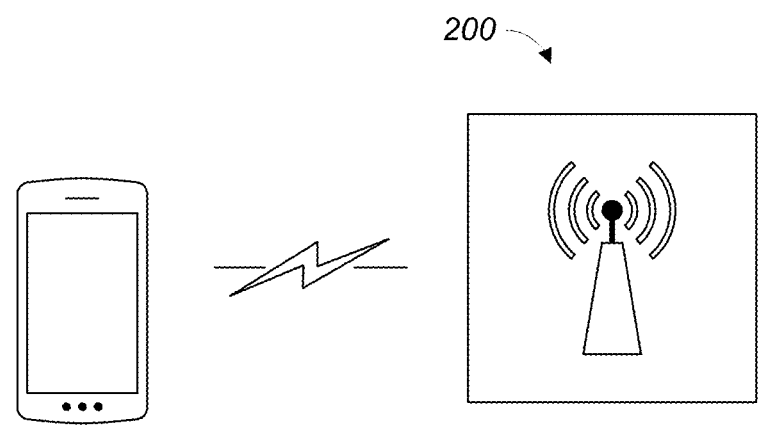
Figure 2C:
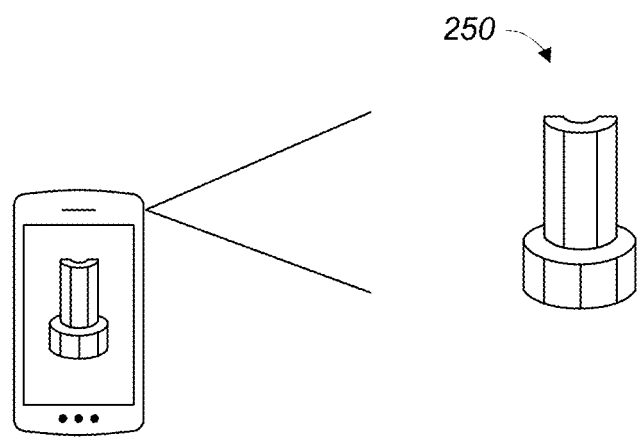

In other embodiments, physical marker 108 may store an applet or app clip, which may enable special or particular functionality within consumer device 102. Such specific functionality may enhance the two-way communications session with a particular professional or service provider or, in some embodiments, may provide the two-way communications functionality, similar to a dedicated application. In some embodiments, the functionality provided by the applet or app clip may include supporting the placement and manipulation of AR objects within the two-way communications session. The applet or app clip may be designed to be temporarily stored and executed by consumer device 102, without need of permanent installation. Permanent, as used here, means installation of an application on consumer device 102 so that it can be used as desired at future times without need of installation; the application will stay installed on consumer device 102 until intentionally deleted. Conversely, the applet or app clip may be automatically deleted following use, either immediately following exiting or discontinuing use or at a predetermined time following exiting or discontinuing use, or following meeting another predetermined condition (e.g. leaving a geographic area where the applet is relevant). Alternatively, physical marker 108 may provide an address or network location from which consumer device 102 may download the applet or app clip. Still further, physical marker 108 may provide a link, location, or other instructions from which consumer device 102 may download a dedicated application, that may be installed on consumer device 102 on a permanent basis as described above. In some embodiments, an app clip or applet may offer a user the option to download and permanently install an app.

Where physical marker 108 is depicted in FIG. 2A as an optically-readable QR code, FIGS. 2B and 2C illustrate further example embodiments of physical marker 108. FIG. 2B illustrates a physical marker 200 implemented as a radio beacon. In such embodiments, physical marker 200 may be an RFID tag, an NFC tag or device, a Bluetooth device, or another wirelessly-accessible or wirelessly-readable device that may be readable by a suitably-equipped consumer device 102. Such a device may be passive, such as an RFID tag, that is powered by RF emissions from the consumer device 102, or may be active, such as a WiFi access point or Bluetooth beacon that requires its own power source. Depending upon the type of radio beacon, the amount of data that may be stored by a radio beacon such as physical marker 200 may be less than, equal to, or exceed the data capable of being optically stored by an optical marker such as physical marker 108. In some embodiments, physical marker 200 may include a data store, such as a memory bank, or be in communication with a separate data store, which can allow storage of an arbitrary amount of data. Because of this, physical marker 200 may be preferred over an optical marker where a substantial amount of contextual material is to be stored. Some embodiments of physical marker 200 may employ multiple different types of radio beacons, potentially supporting different communications protocols, to help ensure a wide range of different types of consumer devices 102 can access the data stored by physical marker 200.

Because physical marker 200 relies upon RF transmission of data, physical marker 200 may be capable of being hidden from view. Where physical marker 200 is a radio beacon, consumer device 102 may be able to read physical marker 200 by simply being in proximity to the physical marker 200. Consumer device 102 need not be facing towards physical marker 200. In some embodiments, physical marker 200 may be embedded within a product or object. In some embodiments, consumer device 102 may be configured to automatically detect physical marker 200 and/or retrieve at least part of the stored data. Consumer device 102 may alert a user to the presence of the physical marker 200 and/or provide the user with the option to initiate a two-way communications session, as described above, or obtain further information about any associated object.

FIG. 2C illustrates a physical marker 250 implemented as an object. The object itself may be capable of conveying data optically, such as by its shape, by encoding similar to the QR code of physical marker 108 or another known optical encoding system (e.g. bar code or 2-D code), by text capable of being recognized using optical character recognition techniques, or any combination of the foregoing or another suitable technique. As will be understood, the amount of data that may be stored by physical marker 250 will depend upon the specifics of a given implementation of physical marker 250.

In still other embodiments, physical marker 250 may be implemented in whole or in part using audio, or have an audio component. In such embodiments, physical marker 250 may emit an audio signal, which could be picked up by a microphone that is either part of or coupled to consumer device 102. As with an optical or radio beacon-based marker, the audio signal may transmit varying amounts of data. The amount of data transmitted will depend upon various factors such as the length of the audio signal, its encoding scheme, and frequency spectrum, as will be understood by a person skilled in the art. Any suitable audio signal scheme may be employed. In various embodiments, the audio signal may be partially or wholly within the audible range of humans, e.g. from 20 Hz to 20,000 Hz, and/or may be partially outside of the human audible range, such as ultrasonic frequencies. In some embodiments, the audio signal may be encoded as a voice, e.g. an understandable speaking voice, in a known language such as English, Chinese, Spanish, etc. In other embodiments, the audio signal may be encoded using a digital signal, similar to the system of tones used to transmit data between computer devices such as a fax machine or modem audio signal. Any suitable modulation method may be employed for encoding the data, e.g. QAM, PSK, etc. In still other embodiments, the audio signal may use some combination of any of the foregoing, e.g. a voice message followed by a digital signal, an audible voice message with an overlaid ultrasonic digital signal, etc.

In some embodiments, physical marker 108 may employ a combination of the QR code of physical marker 108, one or more radio beacons of physical marker 200, a shape or other optical storage of physical marker 250, and/or an audio signal. Such a hybrid type of physical marker 108 may allow various consumer devices 102 to obtain stored data and/or initiate a two-way communications session, when each consumer device 102 may not be identically equipped, or capable of reading all different types of physical marker. In some embodiments, the data stored by each part of a hybrid physical marker may be identical or differ in one or more respects, e.g. have some identical data plus more or less data than other parts. For example, an optically readable component of physical marker 108 may store basic contextual information and a key to allow retrieval of additional contextual information from a remote database, while a radio beacon component of the same physical marker 108 may store more comprehensive contextual information similar to the data stored in the remote database. A consumer device 102 only equipped to read the optically readable component may require data from the remote database, while a consumer device 102 equipped to read the radio beacon component may not require data from the remote database.

Figure 3:
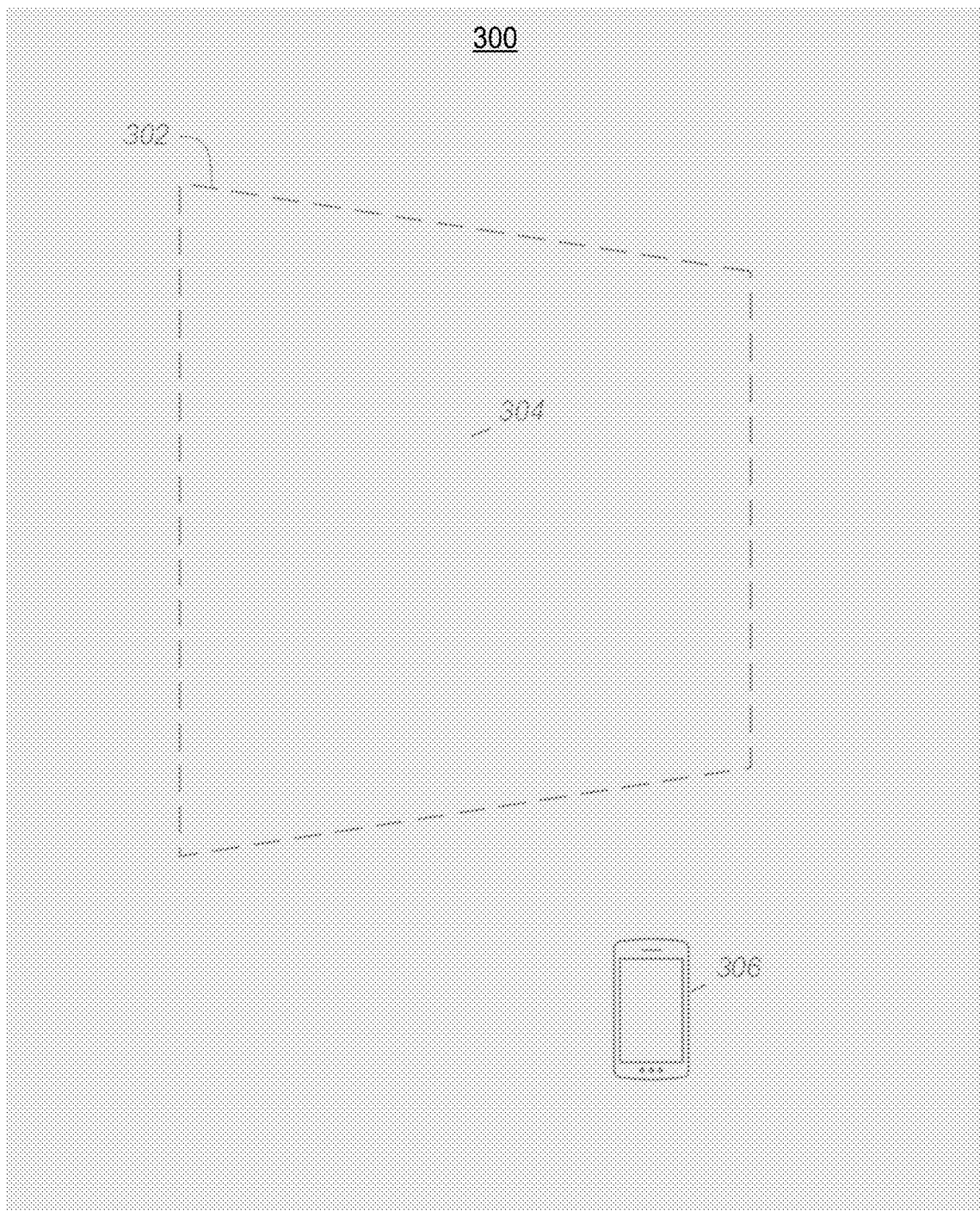
FIG. 3 is an overhead view of a geographic area with a geofence, illustrating possible locations for a consumer device, according to various embodiments.

One possible type of contextual information may be a physical location of consumer device 102. In some implementations, consumer device 102 may transmit its location to central server 107 or service provider device 104, which may be obtained using methods such as proximity to known radio beacons, coordinates from GPS or other another satellite navigation system, or another suitable method. In some embodiments, a geofence, essentially a preestablished virtual or logical boundary around a physical area, may be employed. FIG. 3 depicts an example physical area 300 which encloses a geofenced area 302. The geofenced area 302 may be associated with one or more physical markers 108, and provide contextual information along with the physical markers 108 for selecting an appropriate professional or professionals. The associated physical marker 108 may be located within the geofenced area 302, or outside of geofenced area 302.

As seen in the example of FIG. 3, a first consumer device 304 is located within the geofenced area 302, while a second consumer device 306 is located outside the geofenced area 302. When either of first consumer device 304 or second consumer device 306 connects with central server 107 following scanning a physical marker 108, its location within or without the geofenced area 302 can impact the selection of a professional or professionals by central server 107. Central server 107 may use the location provided by consumer device 102 to determine whether consumer device 102 is within a geofence associated with a given physical marker 108. In some embodiments, physical marker 108 may not be associated with a given geofenced area 302, or may be associated with multiple geofenced areas 302. For example, physical marker 108 may be a business card or another portable item that a user may carry, to allow relatively quick access to a professional for a two-way communications session. Central server 107 may select different professionals for connection depending on whether the user scans the physical marker 108 within or outside of a given geofenced area 302.

As mentioned above, whether a consumer device is located within or outside of a geofenced area may cause the central server to select a different professional or professionals, such as where a service provider may have multiple professionals assigned to different geographic regions. In some embodiments, the presence of a consumer device within or outside of a geofenced area may cause the central server to select a different type of professional. For example, if geofenced area 302 is a store, when consumer device 102 is located within the store, a central server 107 may connect consumer device 102 to a sales professional or advice connecting to a sales professional, to advise about a particular product available within the store. Conversely, when consumer device 102 is outside of the store, and thus outside of the geofenced area 302, the central server 107 may connect consumer device 102 to a service professional (or suggest a service professional) capable of servicing a product that may have been purchased in the store. It should be understood that finer-grained control is possible. For example, a first geofenced area 302 may be located around a particular section of a store such as a first manufacturer's product display area, while a second geofenced area 302 may be located around another section of the store dedicated to a different, second manufacturer's products. Central server 107 may connect the consumer device 102 to the first manufacturer's representatives or the second manufacturer's representatives depending upon whether the consumer device 102 is located within the first or second geofenced area 302. A third geofenced area 302 may be established around a customer service desk or area, where central server 107 will connect consumer device 102 to a customer service agent. Other variations may be possible, depending upon the needs of a given implementation.

In some other embodiments, where an app clip or applet has been placed on and is executed by consumer device 102, the app clip or applet may be configured or may configure the consumer device 102 to detect a geofence, such as the location of consumer device 102 relative to geofenced area 302. The applet or app clip may further be configured to initiate a two-way communications session upon consumer device 102 entering or leaving geofenced area 302. Still further, in some embodiments consumer device 102 may be configured to launch the applet or app clip, or launch an application, upon entering or leaving geofenced area 302, which may in turn initiate a two-way communications session. As may be understood, the geofenced area 302 may be associated with a brand's retail location, such as a store, or a section of a store dedicated to a particular brand.

It should be understood that, while central server 107 is discussed above as selecting a professional for a two-way communications session, such functionality may be performed by any suitable device or system. For example, service provider device 104 may provide at least some of the functionality of central server 107, such as where service provider device 104 may be employed by multiple professionals. In another example, physical marker 108 may include sufficient data to allow consumer device 102 to selectively connect directly to one of a plurality of service provider devices 104. In embodiments where physical marker 108 includes an applet or app clip, the applet or app clip may be able to determine the presence of a geofenced area 302 and the location of consumer device 102 relative to the geofenced area 302, and so direct consumer device 102 to directly connect to an appropriate service provider device 104.

Figure 4:
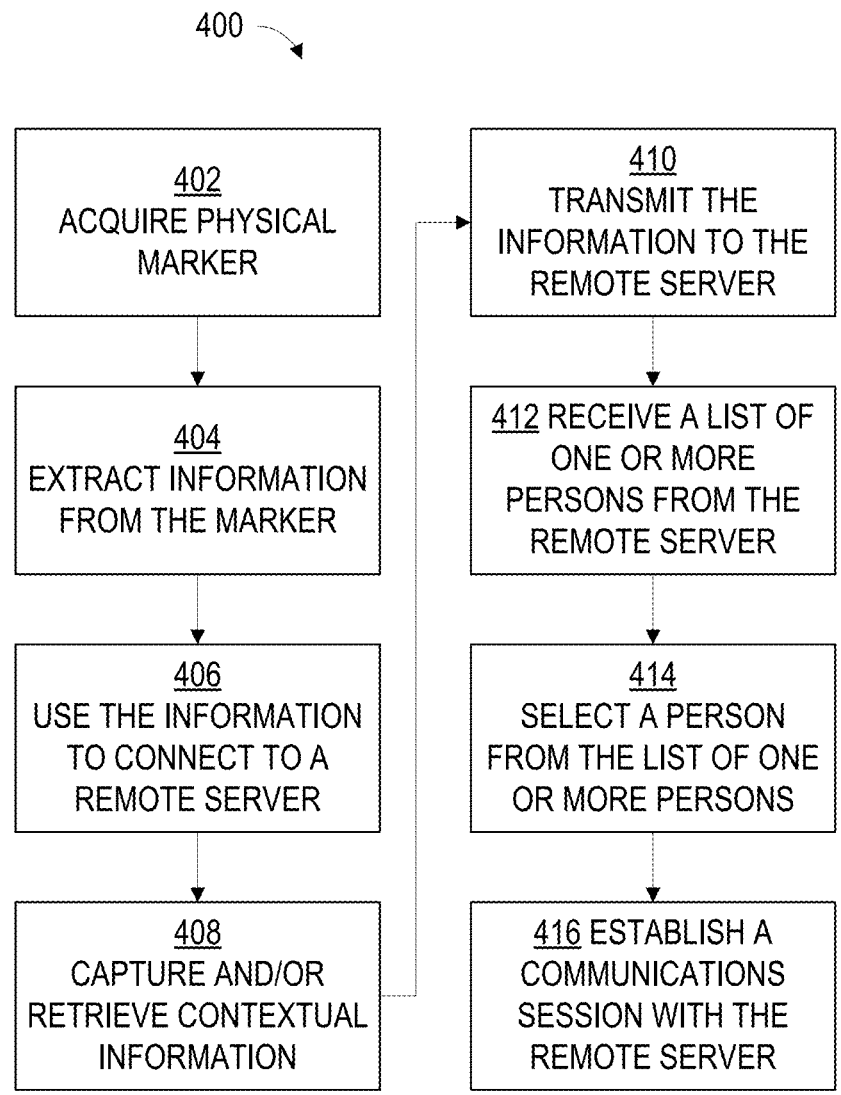
FIG. 4 is a flowchart of a method for initiating a two-way communications session that may be performed by a consumer device using a physical marker, such as the example physical markers depicted in FIGS. 2A-2C, according to various embodiments.

FIG. 4 is a flowchart of an example method 400 that may be executed by a system, such as system 100, that includes a consumer device, such as consumer device 102, and a network accessible server, such as central server 107 via network 106, in association with a physical marker, such as a physical marker 108, 200, or 250, to connect with a professional on a remote system, such as a service provider device 104 over network 106. The system coordinates selection of and connection to the professional to provide desired services, at least partially on the basis of information obtained from the physical marker. Some or all of the operations may be performed, and each operation may be performed in whole or in part, depending upon the needs of a given implementation. Some implementations may perform some of the operations in a different order than as presented in FIG. 4.

In operation 402, the consumer device may acquire a physical marker. The way in which the consumer device acquires the marker may depend upon the nature of the marker. Where the physical marker is optically readable, such as a QR code, text, flashing light sequence, or other visible object, the consumer device may employ a camera or similar sensor to acquire the physical marker, such as by capturing a still photo or a video clip. Where the physical marker is a radio beacon or a similar type of object, the consumer device may employ an appropriate radio transceiver, such as an RFID reader or scanner, a Bluetooth radio, an NFC scanner, a WiFi radio, or other suitable transceiver.

In operation 404, once the marker has been acquired, the consumer device extracts some or all of the information made available by the physical marker. The extraction method will depend upon the nature of the information and how it is stored by the physical marker. In the case of an optical marker, such as a QR code, the consumer device may decode the QR code based upon known standards for QR codes (or the relevant standard for the optical marker if not a QR code). In the case of a radio beacon, such as an RFID tag, the consumer device may send a scanning signal, and receive one or more data packets or data streams in response. Where the radio beacon has an associated storage, the marker may transmit some or all data from the storage. Following extraction, the consumer device will have some or all of the data payload stored by or otherwise associated with the physical marker. This data may include one or more of any of the types of data described above with respect to FIGS. 1 to 3, such as instructions for connecting to one or more remote systems, contextual information, and/or an applet or app clip.

In operation 406, the extracted information is used to connect to a remote server of the system, such as a central server 107 or a service provider device 104. The extracted information may contain a network address, such as an IP address or hostname, of the remote server, or of a system that can provide the address or network location of the remote server. The extracted information may also include data necessary to access the remote server, such as any credentials, security certificates, login names/passwords, encryption keys, access ports, etc. The consumer device can use the extracted information to connect to the remote server over a network, such as network 106. The extracted information may also include data necessary to enable the consumer device to access a database to obtain contextual information, such as where the physical marker lacks the ability to fully store all contextual information. Such data may include the address or network location of the database along with any access credentials, as well as one or more unique keys or search strings that can be used by the database to retrieve the appropriate contextual information. It should be understood that the database may store an array of contextual information for multiple different physical markers; thus, the physical marker may include a unique key or search string to retrieve only the contextual information relevant to the acquired physical marker.

In embodiments, and as described above with respect to FIGS. 1-3, the physical marker supplies contextual information either directly (e.g. via storage of the physical marker) and/or indirectly (e.g. via a database). In operation 408, the consumer device may capture additional contextual information that is not related to the physical marker. This contextual information may be different than the contextual information provided by the physical marker, and may be directly acquired by the consumer device from the physical surroundings of the consumer device. For example, the user may use the consumer device to take one or more pictures or video clips of an object or objects with which the user desires further information or assistance, e.g. an appliance or sales display, a pipe or fixture for plumbing, an assembly on a vehicle where automotive repairs are needed, an appliance information or service tag, etc. In other embodiments, an app, applet, or app clip may initiate a camera following download from the physical marker or remote system, and begin searching for objects within the camera's field of view to capture additional contextual information. In some such embodiments, the app, applet, or app clip may guide or instruct the user in the capture of any necessary additional contextual information, such as pictures, video, image annotations, text entry, audio capture, etc. Other embodiments may trigger capture of a picture or video by means of a user gesture, such as changing the orientation of the consumer device when running an appropriate app or app clip, e.g. turning consumer device from a portrait to landscape orientation. The app, applet, or app clip may then automatically capture a picture or video without the need for further user interaction.

It should be understood that contextual information is not limited only to video or pictures; any information may form part of the contextual information, e.g. audio clips, text, user-entered data (such as the user describing the problem and/or desired outcome), etc. In some embodiments, the app, applet, or app clip may engage various features of the consumer device, such as the camera and/or a radio transceiver, and use the features to capture additional information such as via radio communication with a malfunctioning device. If so equipped, the malfunctioning device may be able to provide various diagnostic information to the consumer device by any suitable technique, which the consumer device can then pass to the system.

Next, the consumer device transmits, in operation 410, the contextual information (both related to/retrieved from the physical marker as well as separately captured by the consumer device) to the remote server of the system. In some embodiments, the consumer device may directly retrieve and transmit all contextual information (from the physical marker, an associated database, and/or separately captured by the consumer device) to the remote server. In other embodiments, the remote server may retrieve at least some of the contextual information, such as from a database using a key obtained from the physical marker. In still other embodiments, the consumer device may only transmit a unique key to the remote server, which the remote server may use to obtain all necessary context. In some further embodiments, the information used by the consumer device to connect to the remote server may include sufficient information to retrieve the necessary contextual information. Consumer device may, in some embodiments, only transmit contextual information captured by the consumer device that is unrelated to the physical marker, as described above, such as where the connection information provided to the consumer device from the physical marker is sufficient to allow the system to obtain contextual information related to the physical marker.

In operation 412, the transmitted information is used by the system, such as system 100/central server 107, to select one or more professionals from those registered with system 100 and present a list of the selected one or more professionals to the user. Additionally, the user may designate criteria to further target or narrow the list of professionals provided by the system. Such criteria may include generally the nature of the user's job (to the extent not determinable from contextual information), desired experience, geographic considerations, etc. The narrowing or targeting criteria may be provided contemporaneously with the contextual information described above, in some embodiments, or may be subsequently provided, such as via one or more filter criteria for the presented list. In some embodiments, the system may further present recommendations to the user. A possible process employed by the system to select the one or more professionals for the list to present to the consumer device is described below with respect to FIG. 5.

In operation 414, the user of the consumer device may, in embodiments, review the qualifications of the recommended professionals in the presented list, and then select the desired professional. In some embodiments, the selected professional may, following selection, be provided with all contextual information, including information from or associated with the physical marker as well as additional contextual information captured by the user of the consumer device. The professional may then have an opportunity to evaluate the potential request, and either accept or turndown the request from the user. Some embodiments may utilize a pre-screening procedure and submit some or all of the contextual information, and/or the summary or digest of the information, to one or more selected professionals in the list for evaluation prior to operation 414. Thus, when the user makes a selection in, the professional has already evaluated the contextual information and is willing to engage in a two-way communications session with the user, should the user select them.

In other embodiments, operation 414 may be carried out entirely by the system, without further interaction from the user. In such embodiments, operations 412 and 414 may be hidden or omitted from the user. Following connection to a remote server in operation 406, capturing/supplying contextual information in operation 408 and transmission of the information to the server in operation 410, the consumer device may be automatically connected to a professional in operation 416 without further interaction. From the perspective of a user in such embodiments, the user simply acquires the marker with the consumer device, as per operation 402, and (optionally) points the consumer device at any relevant objects (e.g. captures additional contextual information). Where the physical marker provides an applet or app clip, the applet or app clip may prompt the user of the consumer device or guide the user in the capture of any necessary additional context. The system may then evaluate the contextual information, select one or more potential professionals, provide the one or more professionals with information to allow evaluation, and immediately proceed to connect the consumer device to the professional in operation 416, effectively bypassing user interaction for operation 414. Still other embodiments may omit the requirement of a professional evaluation as part of operations 412 and 414, and simply select and connect to a professional who previously indicated their willingness to accept certain jobs without requiring specific evaluation.

In still other examples, the system may immediately initiate the communications session with the selected professional, without providing or contemporaneously providing the contextual information, for either quoting or service purposes. In some such examples, the professional may impose one or more AR objects during the two-way communications session, where such communications session is configured to support AR objects, to direct and/or assist the user of consumer device in obtaining any further information necessary to evaluate the user's potential job. In some embodiments, the user may indicate a desire for an evaluation session when selecting the professional. Circumstances where such an evaluation session may be useful include where a user is unsure whether a product is operating normally or is in need of servicing, or is otherwise unable to fully or accurately describe a problem or what the user needs.

Finally, in operation 416, provided the professional also is willing to accept the job, the system may initiate a two-way communications session, such as a video stream, between the user and the professional, with the session supporting augmented reality.

Figure 5:
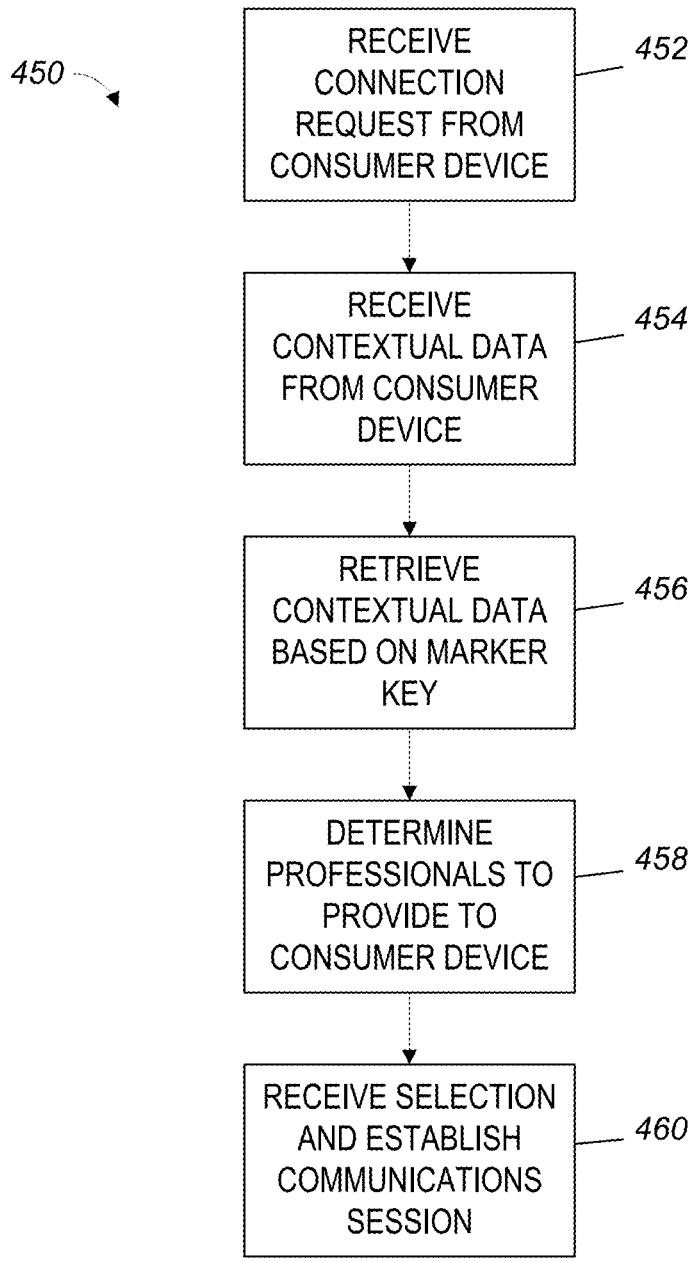
FIG. 5 is a flowchart of a method for initiating a two-way communications session that may be performed by a central server with information from a physical marker, according to various embodiments.

FIG. 5 is a flowchart of an example method 450 that may be executed by a server, such as central server 107, that is part of a system, such as system 100, that includes a consumer device, such as consumer device 102, and a network accessible server, such as central server 107 via network 106, in association with a physical marker, such as a physical marker 108, 200, or 250, to connect with a professional on a remote system, such as a service provider device 104 over network 106. The server determines a selection of professionals to provide desired services, at least partially on the basis of information obtained from the physical marker, and facilitates initiation of a two-way communications session. Some or all of the operations may be performed, and each operation may be performed in whole or in part, depending upon the needs of a given implementation. Some implementations may perform some of the operations in a different order than as presented in FIG. 5.

At operation 452, the server receives a connection request from a consumer device. As discussed above with respect to method 400, the consumer device obtains connection information from a physical marker, which can include the network address or location of the server (including both address and any port numbers, in the case of a server that is available via TCP/IP, such as over the Internet), as well as any necessary credentials for authenticating to the server and establishing the connection.

In operation 454, following establishment of the connection, the server receives any contextual data from the consumer device. The nature of this contextual data was described above with respect to FIGS. 1-4. In some embodiments, the extent of the contextual data may be limited to just the connection itself, viz. the consumer device connecting to the server and possibly authenticating to the server is sufficiently unique to allow the server to obtain any additional needed context. Examples of such an arrangement may include a unique server address or port associated only with one or a set of physical tags that may share common contextual data, such that simply connecting to the server is providing contextual data. In another example, a particular set of authentication credentials is associated only with one or a set of physical tags, and likewise simultaneously provides contextual data. Other contextual data, as described above with respect to method 400, may include a unique ID or code provided by the physical tag, contextual data stored by or associated with the physical tag that is retrieved by the consumer device, and/or contextual data captured by the consumer device that is unrelated to the physical tag.

In operation 456, the server may retrieve additional contextual data (or all contextual data, where the consumer device does not provide any contextual data beyond a key, authentication data, or connection data). As discussed above with respect to method 400, the server may retrieve any such additional contextual data from a data store or database in communication with the server. The server may use authentication data or a unique key from the consumer device, which was obtained from the physical marker, to access the relevant contextual data in the data store or database. In embodiments where the fact of connection is sufficient to supply context, e.g. the server's connection address is uniquely tied to a physical marker or set of physical markers, the server may retrieve the contextual data that is tied to the connection. In some such examples, the contextual data may be common and unchanging between connections; the server may simply keep a stored set of contextual data for use with each connection.

Following receipt and retrieval of the contextual data, in operation 458 the server determines, using the contextual data, which professional or set of professionals from professionals registered with the system to provide to the consumer device, for selection of a professional by the user. The server may use a variety of different techniques to select the professional(s) on the basis of the contextual data. For example, the system may perform object recognition on some of the contextual information to ascertain potential problems or areas of focus, and use such information to select a professional or professionals that are most relevant to the problems or areas of focus. Object recognition may be performed using any suitable algorithm or technique now known or later developed. In some embodiments, an AI system, which may be trained with different object variations, e.g. multiple refrigerators, toilets, etc., may be used to provide object detection where a given object may vary in different aspects. The AI system or algorithm may be implemented using any suitable AI technique now known or later developed; in some embodiments, the AI system or algorithm may comprise a neural network or mapping neural network, which may have one or more layers of nodes, and is capable of being trained. As with central server 107, the AI system may be implemented in software, in hardware (including dedicated hardware platforms, such as Apple's Bionic engine), or a combination of both. The particulars of a given AI system or technique implementation will vary depending upon the particular needs of a given embodiment.

For example, if the recognized object is a toilet or a sink, the system may search for a list of professionals that specialize in plumbing matters (or possibly even specific to an identified brand of fixture, discussed below), and present a list of one or more suitable professionals to the user of consumer device. The various professionals may be weighted according to various factors, e.g. most relevant to the recognized object, highest amount of experience, highest consumer or customer rating, closest to the user, pricing, etc., and presented to the user in the weighted order. A user of the consumer device may also or alternatively be able to sort by various weighting criteria (e.g. lowest to highest price, best to worst reviews, etc.), and may have previously entered criteria preferences into the system to enable the system to more accurately select professionals that best fit within a user's preferred criteria and weighting. Alternatively, the system may immediately initiate a communications session between the user and the highest matched professional.

For another example, where a toilet is recognized, the system may be able to distinguish between brands of toilets, e.g. American Standard, Toto, Kohler, Delta, etc., and may further be able to factor brand into the criteria for selecting a list of professionals, to limit the list or weight the list towards professionals that have direct experience and/or expertise with the particular brand, stock the brand's parts, are an authorized brand service center or provider, or other similar preferential criteria.

For yet another example, where an appliance such as a dishwasher or refrigerator is detected, a user may be prompted to select between multiple possible types of professionals. Depending on the problem, servicing a dishwasher or refrigerator (or similar sort of appliance) may require the services of an appliance repairman, an electrician, or a plumber. The user may then indicate to the system which professional is desired. In some embodiments, the contextual information may include additional or alternative photos of the appliance to help the system deduce the needed professional. For example, a picture of a refrigerator may be coupled with a fixture of the refrigerator's water line hookup, which the system may use, via AI and/or object detection, to determine that a plumber is the needed professional.

As another example different from household repairs, a photo of an instrument may indicate to the system that the user is looking for music lessons, with the type of instrument suggesting the type of desired teacher, e.g. piano, guitar, violin, etc. Likewise, a picture of a stereo may lead the system to recommend specialists in home theater. In any event, the user may supply the system with further information in the form of the additional contextual data to help narrow down suggested professionals, with the further information supplied in any number of different formats, including photos, text, video, audio, files, or any other suitable format for which the system is configured to accept.

In some embodiments, object detection may be combined with, or supplanted by, audio detection. Rather than look for an object, a video file with a recorded sound of a problem may be supplied to the system, which can use AI or audio pattern matching to select a professional. For example, a picture of a vehicle engine combined with an audio clip of the sound of the engine running may allow the system to determine that an auto mechanic is the particular professional required (including a mechanic specific to the make and model, if determined from the picture), with the audio clip indicating that the engine's turbocharger is failing, thus leading the system to suggest an auto mechanic that specializes is turbocharged engines. Alternatively, in some embodiments a simple audio file may be all that is required. For example, the sound of a malfunctioning dishwasher may be sufficient to allow the system, if properly configured, to determine that a dishwasher needs service, and further the type of service that may be needed.

In yet another non-service related scenario, the user of the consumer device may be in a store, browsing possible appliances, and use a physical marker associated with a particular appliance to initiate a communications session. The server may, upon receipt of the connection from the consumer device, recognize the physical tag (from information from the consumer device, as described above) and use it to connect the consumer device to a sales associate or manufacturer's representative familiar with the appliance to help answer any questions the user may have. In some circumstances, the server may offer the user a choice of persons to speak with, e.g. a sales representative of the store who may be able to offer comparison data between different makes and models of the appliance, or a manufacturer's representative who may be able to offer deeper information about a particular model, or may be able to provide comparison data between models from the same manufacturer, a service technician who could advise about installation issues, etc.

It should be appreciated that the system may be configured to accept as additional contextual data any media type or file capable of analysis by automated means as input for selecting one or more relevant professionals. Where a media type other than an image or video is employed, "object recognition" should be understood to encompass any appropriate analysis to determine the object or source of a given media type, e.g. sonic recognition of an automobile engine, a dishwasher, or other object based on a particular unique sound pattern emitted by the object. Object recognition may further be used in conjunction with an AI algorithm, or may be a function carried out by the AI algorithm, such as where the AI algorithm is trained to differentiate between different brands and/or types of an appliance or other object.

Finally, in operation 460, the server receives a selection from the consumer device of a professional, and establishes a two-way communications session with the selected professional. As discussed above with respect to method 400, in some examples the server may bypass operation 458 and automatically select a professional to connect with the user. The user may simply be given a button or option to initiate the communications session when the user is ready, and possibly within a predetermined time limit. In some further examples, the server may automatically initiate the communications session shortly following the scanning of a physical marker by the consumer device.

In other embodiments, following the acquiring/scanning of the physical marker and providing of contextual data per method 400, the system may notify one or more of the professionals selected by the server from operation 458 of a pending job or communications session. The system may provide the one or more professionals with the contextual data or a digest thereof, thereby allowing each possible professional to review the job information and contextual data as described above, e.g. photos, description of goals, desired experience, etc. Provided the job is acceptable to the professional, the professional may accept the job.

In some embodiments, the server may provide the contextual data only to the professional selected by the user of the consumer device, who then evaluates and determines whether to accept. The user of the consumer device may receive an indication that the professional is evaluating the job, and then be notified if the professional has accepted the job and is ready to commence the two-way communication. In other embodiments, in operation 458 the server may provide the contextual data to a selected set of professionals prior to providing a list of professionals to the consumer device, and allow the professionals to preliminarily determine whether to take the job. Once a predetermined number of professionals has indicated a willingness to accept, the server may then provide the consumer device with a list of accepted professionals, so that the two-way communications session may be immediately initiated upon selection of a professional in operation 460. In still other embodiments, the consumer device may be provided a list of possible professionals substantially contemporaneously with making the contextual data available to each listed professional, so that the professionals can evaluate the data either while awaiting selection, or will have the data immediately available for evaluation should the user indicate selection.

Following acceptance of the job by the professional, the system starts a video session between the user and the professional. The professional can use the video stream to see the specifics of the project the user is tackling or requires a quote for subsequent service, and further can use augmented reality tools to visually demonstrate to the user steps to take, enhancing the delivery of remote services beyond simple voice instructions. The contextual data may also be made persistently available for reference during the two-way communications session. Where the session is used for quoting, the professional may employ AR tools to guide the user in providing the professional with necessary information to provide an accurate quote. As mentioned above, in some embodiments a professional may forego evaluation, either simply accepting any job that is offered, or possibly preapproving certain types of jobs that the professional knows can be safely accepted without detailed evaluation.

It should be appreciated that various blocks or portions of blocks for methods 400 and 450 may be modified or omitted in various embodiments, while other embodiments may add additional tasks or blocks.

FIG. 6 illustrates an example computer device 500 that may employ the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown but could include at least the display area 301 of electronic sign 106), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and methods 400 and 450 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
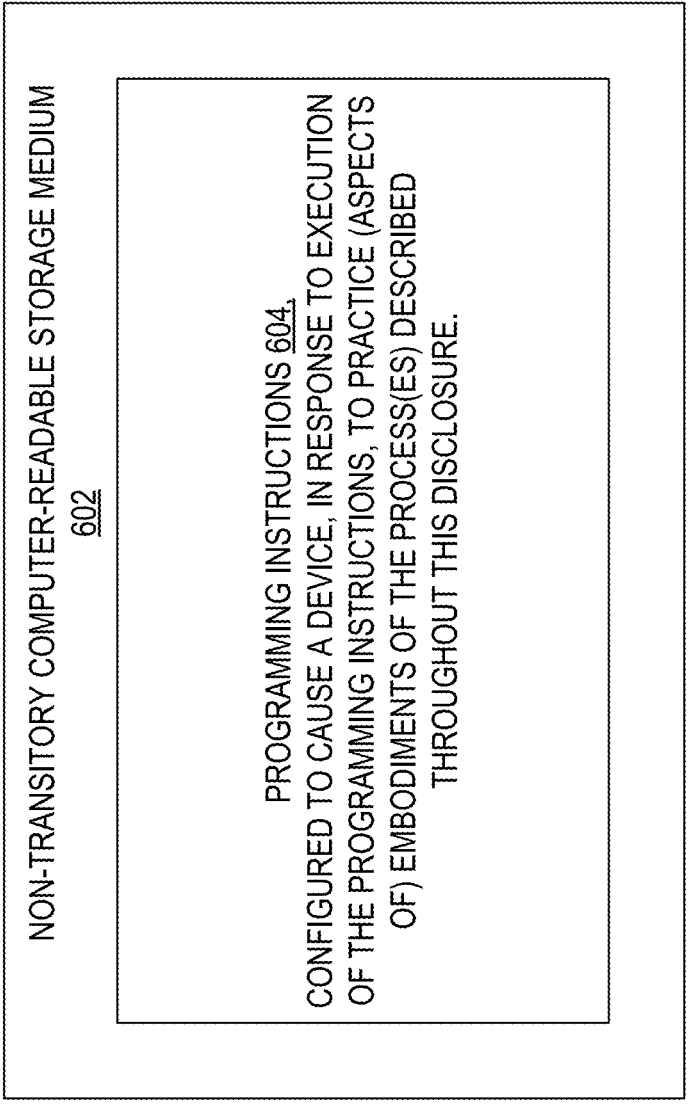
FIG. 7 is a block diagram of a computer-readable storage medium that can be used to implement some of the components of the system or methods disclosed herein, according to various embodiments.

FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 400, and/or method 450. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A method comprising:
   extracting, by a computing device, from a read-only physical marker, information to connect with a remote server;
   capturing, by the computing device, one or more pictures or video of the physical marker's context;
   connecting, by the computing device using the extracted information, to the remote server;
   transmitting, by the computing device, the one or more pictures or video to the remote server;
   receiving, from the remote server, a list of one or more persons to communicate with a user of the computing device, each of the one or more persons relevant to at least one aspect of the physical marker and the one or more pictures or video; and
   initiating, by the computing device, a two-way communications session between the remote server and the computing device, the two-way communications session with a person selected from the list of one or more persons.

2. The method of claim 1, wherein the physical marker is a visual marker, and the information is extracted using one or more optical sensors coupled to the computing device.

3. The method of claim 2, wherein the physical marker is a QR code, a bar code, text, or an object.

4. The method of claim 1, wherein the information is extracted from the physical marker using radio frequency emissions.

5. The method of claim 4, wherein the physical marker is an RFID tag, an NFC tag, or a Bluetooth device.

6. The method of claim 1, wherein the information to connect with the remote server comprises executable code, and the method further comprises executing, by the computing device, the executable code.

7. The method of claim 1, further comprising:
   determining, by the computing device, a physical location of the computing device; and
   transmitting, by the computing device, the physical location to the remote server; and
   wherein each person on the list of one or more persons is relevant to the physical location.

8. The method of claim 7, wherein the computing device determines the physical location at least in part using satellite location information.

9. The method of claim 7, further comprising:
determining, by the computing device, with the physical location, whether the computing device has crossed a geofence; and
transmitting, by the computing device to the remote server, whether the computing device has crossed the geofence; and
wherein each person on the list of one or more persons is relevant to whether the computing device has crossed the geofence.

10. The method of claim 1, further comprising transmitting at least part of the extracted information to the remote server.

11. A non-transitory computer-readable medium (CRM) comprising instructions that, when executed by an apparatus, cause the apparatus to:
extract, from a read-only physical marker, information to connect to a remote server;
capture one or more pictures or video of the physical marker's context;
determine a physical location of the apparatus;
connect, using the information extracted from the read-only physical marker, to the remote server;
transmit the physical location and the one or more pictures or video to the remote server;
receive, from the remote server, a list of one or more persons to communicate with a user of the apparatus, each of the one or more persons relevant to the physical location of the apparatus and the one or more pictures or video; and
initiate a two-way communications session between the remote server and the apparatus.

12. The CRM of claim 11, wherein the instructions are further to cause the apparatus to determine the physical location using satellite location.

13. The CRM of claim 11, wherein the instructions are further to cause the apparatus to determine whether the physical location is within a geofence.

14. The CRM of claim 13, wherein the geofence defines a physical area, and the list of one or more persons are relevant to the physical area.

15. The CRM of claim 14, wherein the physical area is a building or a portion of a building.

16. The CRM of claim 11, wherein the communications session allows insertion of one or more augmented reality objects received from the remote server that are displayed on the first device.

* * * * *